Oct. 29, 1957   A. BREDENBERG, JR   2,811,684
DIFFERENTIAL RELAY PROTECTIVE SYSTEM
Filed March 17, 1955
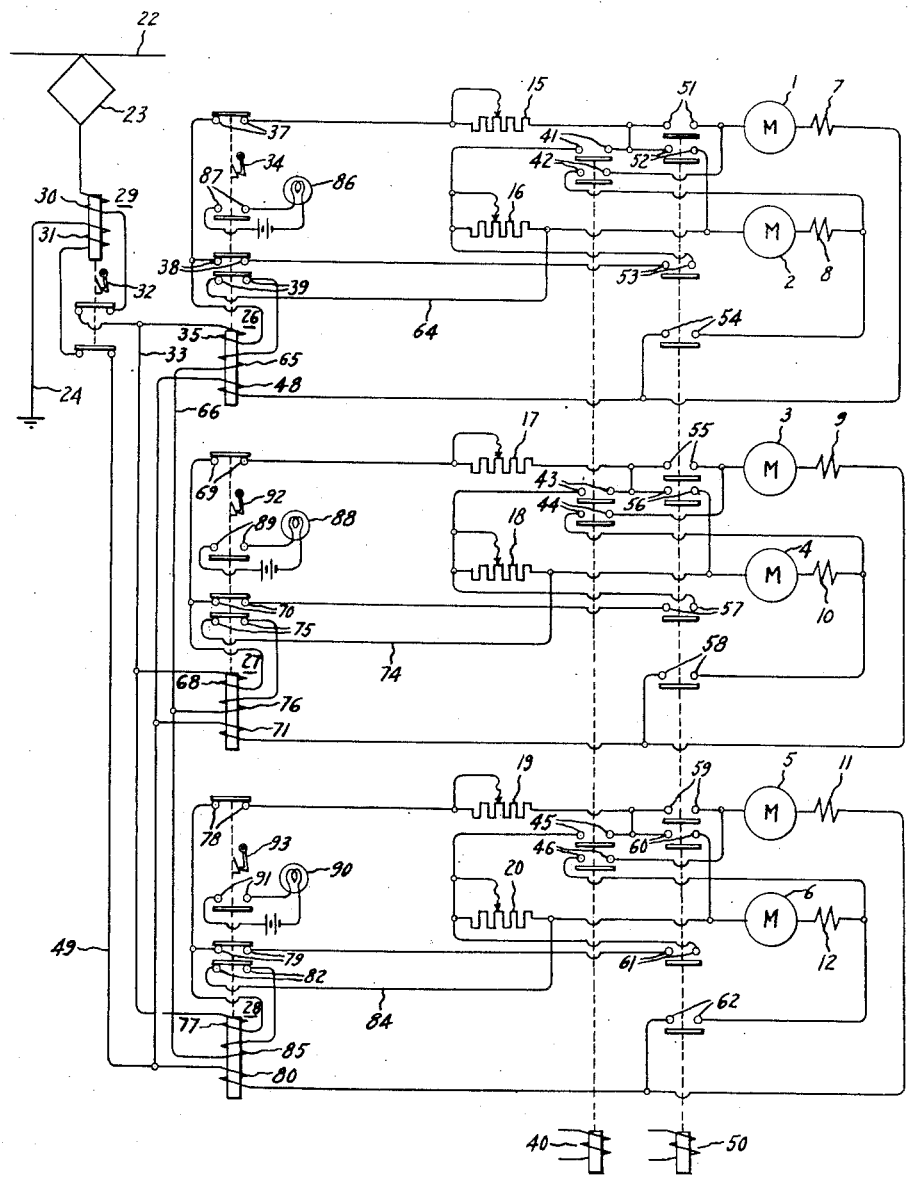
Inventor:
Alfred Bredenberg, Jr.,
by  [signature]
His Attorney.

United States Patent Office 2,811,684
Patented Oct. 29, 1957

2,811,684

DIFFERENTIAL RELAY PROTECTIVE SYSTEM

Alfred Bredenberg, Jr., Erie, Pa., assignor to General Electric Company, a corporation of New York Application March 17, 1955, Serial No. 494,983

6 Claims. (Cl. 318—104)

My invention relates to a differential relay protective system for traction motors and more particularly to a ground fault protective system for the motor circuits of a traction vehicle such as an all-electric or diesel-electric locomotive utilizing traction motors of the direct current type.

This invention especially relates to traction motors which are connected together electrically by tie connections during acceleration in such a way that the accelerating resistor banks are connected in parallel and serially connected to the parallel traction motors during each acceleration. These tie connections serve to equalize the voltage applied to each traction motor throughout the accelerating period, even though there may be a considerable difference in the currents in the various resistor banks in parallel. This connection gives the added advantage of reducing the number of accelerating contactors required to obtain a given number of accelerating steps. In other words, various portions of the paralleled accelerating resistors may be shunted sequentially without unbalancing the system. Past practice has been to connect differential protective relay coils in the motor circuits with the one coil connected between the accelerating resistor and the motor and the other coil between the motor and the power supply to provide ground fault protection for the motors, but this arrangement does not provide ground fault protection for the accelerating resistors or associated switching equipment.

Therefore, an object of my invention is a simple and reliable protective differential relay system providing complete ground fault protection for the traction motors, accelerating resistors and associated switching equipment of a locomotive having a plurality of traction motors.

In accordance with my invention in one form, I utilize a differential relay of the type having one winding connected directly in tie line. The other windings carry the current from the power supply to the accelerating resistors and motors and from the motors back to the power supply. The power line windings are magnetically bucking each other and the tie line winding bucks the larger of the power line windings in the absence of ground fault conditions.

Further objects and advantages of this invention will become apparent and the invention will be better understood from the following description, with reference to the accompanying drawings. The features of novelty which characterize this invention will be pointed out with particularity in the claims annexed to and forming a part of the specification.

In the drawings, the single figure is a schematic of the control system utilizing my differential relay.

Referring to Fig. 1, I have shown the traction motors 1, 2, 3, 4, 5 and 6 having field windings 7, 8, 9, 10, 11 and 12 respectively. The variable acceleration resistors 15, 16, 17, 18, 19 and 20 are connected in circuit with the motors to limit the current therethrough during acceleration.

The power is supplied from a power line 22 to a pantograph 23 and returns through a ground line 24. The differential relays 26, 27, 28 and 29 protect the system from any type of ground fault. A differential relay 29 protects the entire motor system by passing the current from the power line 22 to traction motors through a relay coil 30, and the current from the traction motors to the ground return line 24 through a differential relay coil 31. These two coils are connceted to the circuit in a sense to provide a magnetic bucking relation. A damaging ground fault any place in the motor circuit will cause a difference between the currents in the coils 30 and 31 sufficient to open this relay 29 and disconnect the entire system from the power line and ground return. A latch 32 is provided to maintain the relay 29 in the open position after a ground fault signal. The latch 32 may be released manually or by a conventional relay coil to allow the differential relay 29 to return to the closed position.

However, it has been found that a ground fault may occur in one of the traction motors or one of the accelerating resistors so that the locomotive could be operated on the remaining traction motors, if they could be energized, without the necessity of towing the locomotive to the repair shop. When a locomotive is in operation, a breakdown which prevents the movement of the locomotive under its own power is invariably costly and often hazardous to property or personnel.

Therefore, it is desirable to provide for operation of the various pairs of traction motors and to further protect the motors by individual differential relays such as those shown at 26, 27 and 28. With the added differential relays, it is possible to cut out a grounded traction motor circuit including the associated accelerating resistors and operate the locomotive by energizing the remaining traction motors which do not have a ground fault.

Assuming that the latch 32 is released and the relay 29 is closed, the power connection line 33 is energized from the pantograph 23. During acceleration, the current to the traction motors 1 and 2 passes from the line 33 through the coil 35 of the relay 26 to the normally closed contacts 37 and 38 to the motor circuit protected by this relay. The contacts 39 are also normally closed.

In order to substantially reduce the initial starting current in the traction motors 1, 2, 3, 4, 5 and 6, the motors are started in series pairs with the traction motors 1 and 2, the traction motors 3 and 4, and the traction motors 5 and 6 respectively connected in series. This is accomplished by energizing a series relay or relays shown schematically as the series relay 40 to close the contacts 41, 42, 43, 44, 45 and 46.

Referring to the circuits of traction motors 1 and 2, with the traction motors serially connected, the current passes from the coil 35 of the differential relay 26 through the contacts 37, through the accelerating resistor 15, through the contacts 41 of the series relay 40, through the accelerating resistor 16, through the motor 2, through the contacts 42 of the series relay 40, through the traction motor 1, and returns through a differential coil 48 of the differential relay 26 through the line 49 to the ground return line 24. The relay coils 35 and 48 are magnetically connected so that each will cancel the flux of the other when they carry equal currents.

When the locomotive reaches a predetermined speed in this series connection, the paralleling relay or relays shown schematically as the relay 50 is closed and the series relay 40 is opened, to place the motors in parallel operation by closing the contacts 51, 52, 53, 54, 55, 56, 57, 58, 59, 60, 61 and 62 and opening the contacts 41, 42, 43, 44, 45 and 46 of the series relay 40. The variable accelerating resistors 15 and 16, which have now been placed in parallel with each other and in series with the parallel traction motors 1 and 2 respectively by the opening of the contact 41 and the closing of the contacts 51, 52 and 53, limit the current through the traction motors. As the train accelerates to full series speed and as it accelerates to full parallel or maximum speed, the accelerating resistors are shunted selectively from the traction motor circuits to maintain the current through the traction motors and the torque of the traction motors at the safe maximum operating value. The actual control for shunting the accelerating resistors is not a portion of this invention and will not be further described. One system for automatically shunting the accelerating resistors of a traction motor circuit during acceleration is fully shown and described in the Letters Patent 2,566,898 of H. G. Moore and I. W. Lichtenfels, issued September 4, 1951 and assigned to the assignee of the present invention.

In order that the traction motors 1 and 2 shall receive the same voltage as the motors 3, 4, 5 and 6 during series acceleration, a tie line 64 is connected between the accelerating resistor 16 and the motor 2 at one end and passes through the contacts 39 and coil 65 of the differential relay 26 to a tie line common junction 66. During the parallel acceleration the tie line 64 is also connected to a point between the resistor 15 and the motor 1 by the closing of contact 52.

The operation of the second pair of traction motors 3 and 4 is similar to that of the traction motors 1 and 2 with the power coming from the line 33, through a relay coil 68 of the differential relay 27 to the contacts 69 and 70 and returning to the line 49 through a differential relay coil 71 of the differential relay 27. During series operation a tie line 74 is connected between the accelerating resistor 18 and the motor 4 at one end and passes through the normally closed contacts 75 and the coil 76 of differential relay 27 to the common junction 66. Similarly, the traction motors 5 and 6 receive power from the line 33 through the coil 77, the contacts 78 and 79, and the power returns to the line 49 through a differential relay coil 80. During series acceleration a tie line 84 is connected between the accelerating resistor 20 and the motor 6 at one end and passes through the normally closed contacts 82 and the coil 85 to the common junction 66. During parallel acceleration the tie lines 74 and 84 are connected to a point between the resistor 17 and the motor 3 and between the resistor 19 and the motor 5 by the closing of the relay contacts 56 and 60 respectively.

The use of the tie lines 64, 74 and 84 between the pairs of traction motors during series acceleration and between the traction motors of each pair during parallel acceleration is to equalize the voltage across the traction motors. It has been found from past experience that the acceleration resistors do not always present an equal impedance. With the locomotive accelerating at the maximum rate, it is necessary that the traction motors provide equal and maximum tractive efforts. Without this equalization, one of the traction motors will tend to provide more tractive effort than the others, so that slipping is more likely to occur. If the tie lines are omitted, slipping may be prevented by reducing the rate of acceleration which is objectionable because of the increased acceleration time required.

Assuming that during series acceleration, with no ground fault, the resistors 15 and 16 present less impedance and carry more current than the resistors 17, 18, 19 and 20, the tie line 64 will carry current from the resistors 15 and 16 to the traction motors 3, 4, 5 and 6. In this instance, the currents in the coils 48 and 65 equal the current in the coil 35. The coil 65 is so connected that current flow therein maintains a zero net flux in the relay 26. If the sum of the impedance of the resistors 15 and 16 were increased and the current in the coil 65 were reversed, the coils 35 and 65 combine to cancel the flux produced by the coil 48.

If a two-element differential relay were used in place of the three-element differential relay 26, this current differential in the tie line 64 would often decrease or increase the current in the coil 48 relative to the current in coil 35, enough to operate the differential relay and disconnect the traction motors 1 and 2 which would reduce the tractive effort of the locomotive by one-third. While it would be possible to bias the two-element differential relay so that it would be insensitive to such a differential current, this would not provide the sensitive protection that is necessary to prevent damage to the traction motors or resistor circuits in case of a ground fault. Therefore, it is necessary to pass the current of the line 64, through the coil 65 of the three-element differential relay 26, so that the algebraic sum of the currents in the relay 26 is negligible with the flux produced by the coil 65 cancelling the difference between the flux of the coils 35 and 48 in the absence of a ground fault.

In the event of a ground fault in the circuit of the traction motors 1 and 2, the ground return current in the coil 48 will be reduced in an amount equal to the current of the ground fault. Obviously, the flux in the differential relay 26 is no longer negligible as the algebraic sum of the current in the coils 35 and 65 is larger than the bucking coil 48 current. Also, if there is any appreciable impedance shunted by the ground fault, the impedance of the circuit of the traction motors 1 and 2 will be reduced thereby so that the current through the coil 35 will be proportionally increased, and the current of the coil 65 will be of a direction to aid the coil 35. These conditions, if the ground fault is severe, will immediately energize the relay 26 to open the contacts 37, 38 and 39 to disconnect the traction motors 1 and 2 and move the armature of the differential relay 26 sufficiently to engage the latch 34. The latch 34 will remain engaged until the operator manually or electrically disengages it.

In order to allow immediate and accessible indication of a faulty circuit, the indicator lamps 86, 88 and 90 have been connected to be energized from a low voltage source such as a battery by the operation of the differential relays 26, 27, and 28 respectively. This may be done by adding the normally open contacts 87, 89 and 91 to be closed by the energization of these differential relays. With the use of these indicator lamps and the latches 34, 92 and 93, the operator is able to locate the faulty traction motor circuit without testing or guesswork.

Thus, it is readily seen that this relay protective system provides a sensitive protection for ground faults, for protecting both the traction motors and the accelerating resistor circuits while utilizing an equalizing tie connection between the motor circuits. When protecting both the traction motors and the accelerating resistors, the use of a sensitive differential relay is practicable only with this tie connection with the use of a 3-bus bar or 3 coil differential relay.

While I have shown and described a particular embodiment of this invention, further modifications and improvements will occur to those skilled in the art. For instance, each pair of traction motors might be replaced by a single motor. The circuit necessary for such operation is identical to the series operation explained above. I desire it understood, therefore, that this invention is not limited to the form shown, and I intend by the appended claims to cover all modifications which do not depart from the true spirit and scope of this invention.

What I claim as new and desire to secure by Letters Patent of the United States is:

1. In a protective system for an electric vehicle having a plurality of similar traction motors, an acceleration resistor connectable to each of said motors to provide a series circuit, tie lines each having one end connectable respectively to one of the circuits at a point electrically between the motor and its associated resistor and having the other end connected to a junction common to all of the tie lines, a plurality of differential relays each having contacts connected in one of the motor circuits adapted to disconnect the circuit from a power supply in the event of a ground fault in the one circuit, each relay comprising a first coil connected to sense the current supplied to the one motor circuit, a second coil connected to sense the current passing from the one motor circuit, a third coil connected to sense the current in the tie line connected to the one motor circuit, said first and second coils being connected to provide opposing magnetic flux, and, in the absence of a ground fault, said third coil being connected to provide a flux opposing any differential flux current whereby a ground fault will partially shunt said second coil to unbalance the flux pattern of the differential relay to open its contacts.

2. In a protective system for an electric vehicle having a plurality of pairs of similar traction motors, an acceleration resistor connectable in circuit with each of the motors, and tie lines each adapted to have one end connected respectively to a point electrically between each of the pairs of motors and the associated resistors and to have the other end connected to a common junction, a plurality of differential relays each having contacts connected in circuit with one of the pairs of motors and the associated resistors to open the circuit of the one pair of motors in the event of a ground fault therein, each relay comprising a first coil connected to sense the current supplied to the one pair of motors, a second coil connected to sense the current passing from the one pair of motors, a third coil connected to sense the current in the tie line of the one pair of motors, said first and second coils being connected to provide opposing magnetic flux and said third coil being magnetically connected to provide a flux opposing any differential current between said first and said second coils in the absence of a ground fault whereby a damaging ground fault will partially shunt said second coil to allow said first and said third coils to energize the differential relay to open its contacts.

3. In a protective system for an electric vehicle having a plurality of similar traction motors, an acceleration resistor connectable in circuit with each of the motors, tie lines each having one end connectable respectively to a point between each of the motors and the associated resistors and having its other end connectable to a common junction, electric circuit means for connecting each of the motor circuits to a power supply having one power line and one line grounded, a plurality of differential relays, each relay comprising a first coil connected to sense the current supplied from the power line to the one motor circuit, a second coil connected to sense the current passing from the one motor circuit to the ground line, a third coil connected to sense the current in the tie line of the one motor circuit, said first and second coils being magnetically connected to provide opposing flux, said third coil being magnetically connected to provide a flux opposing any differential flux caused by flow of current between the one motor circuit and other motor circuits, said three coils being so arranged that a damaging ground fault will partially shunt said second coil to energize said differential relay, a contact of the relay connected in the tie line of the one motor circuit, another contact connected serially between the one motor circuit and the power line, said contacts adapted to be opened by the energization of said relay to remove other than ground potential from the one motor circuit.

4. In a protective system for an electric vehicle having a plurality of pairs of similar traction motors, an acceleration resistor serially connectable between each of the motors and a power supply line, a plurality of tie lines each having one end connectable respectively to a point between one of the pairs of motors and the associated resistors and having the other end connected to a junction common to each of the tie lines, electric circuit means for connecting each of the resistors to the power supply line and each of the motors to a grounded return line of a power supply, a plurality of differential relays each connected in circuit with one pair of traction motors, each relay comprising a contact connected between the power supply line and the resistors of the one pair to disconnect the power supply from the pair in the event of a ground fault in the one circuit, a second contact adapted to open the tie line, a first coil connected to sense the current supplied to the one pair of motors from the power supply line, a second coil connected to sense the current passing from the one pair of motors to the grounded return line, a third coil connected to sense the current in the tie line for the one pair of motors, said first and second coils being magnetically connected to provide opposing flux, said third coil being magnetically connected to provide any differential flux when the tie line is carrying current to or from the one pair from or to another pair in the absence of a ground fault, said second coil being near ground potential electrically whereby a damaging ground fault will partially shunt said second coil to reduce the flux produced thereby which will allow said first coil to energize the differential relay, said contacts adapted to be opened by the energization of the relay whereby the one pair of motors is disconnected from the power supply by the energization of the relay, and another contact of the relay connected in circuit with an indicator lamp and a voltage source and adapted to be closed by the energization of the relay to provide a signal indicating the energization of the relay.

5. In a protective system for an electric vehicle having a plurality of similar traction motors, an acceleration resistor connectable in circuit with each of the motors, tie lines each having one end connectable respectively to a point between each of the motors and the associated resistors and having its other end connectable to a common junction, electric circuit means for connecting each of the motor circuits to a power supply having one power line and one line grounded, a plurality of differential relays each having contacts connected in one of the motor circuits adapted to open the one circuit in the event of a ground fault therein, each relay comprising a first coil connected to sense the current supplied from the power line to the one motor circuit, a second coil connected to sense the current passing from the one motor circuit to the ground line, and a third coil connected to sense the current in the tie line for the one motor circuit, said first and second coils being magnetically connected to provide a flux opposing any differential flux caused by flow of current between the one motor circuit and other motor circuits, said three coils being so arranged that a damaging ground fault will partially shunt said second coil to energize said differential relay and another differential relay adapted to disconnect the power supply line from the plurality of motors in the event of a substantial difference between the current from the supply line and the current to the ground return line.

6. In a protective system for an electric vehicle having a plurality of pairs of similar traction motors comprising an acceleration resistor serially connectable between each of the motors and a power supply line, a plurality of tie lines each having one end connectable respectively to a point between one of the pairs of motors and said associated resistors and having the other end connected to a common junction, electric circuit means for connecting each of said resistors to said power supply line and each of the motors to a grounded return line of a power supply, a plurality of differential relays each connected in circuit with one pair of traction motors, a contact of one of said relays connected between said power supply line and said resistors of said one pair to disconnect said power supply from said pair in the event of a ground fault in said circuit, a second contact of said one relay adapted to open said tie line, a first coil connected to sense the current supplied to said one pair of motors from said power supply line, a second coil connected to sense the current passing from said one pair of motors to said grounded return line, a third coil connected to sense the current in said tie line for said one pair of motors, said first and second coils being magnetically connected to provide opposing flux, said third coil being magnetically connected to provide any differential flux when said tie line is carrying current to or from said one pair from or to another pair in the absence of a ground fault, said second coil being near ground potential electrically whereby a damaging ground fault will partially shunt said second coil to reduce the flux produced thereby which will allow said first coil to energize said relay, said contacts adapted to be opened by the energization of said relay whereby said one pair of motors is disconnected from said power supply by the energization of said relay, another contact of said relay connected in circuit with an indicator lamp and a voltage source and adapted to be closed by the energization of the relay to provide a signal indicating the energization of the relay, and another relay adapted to disconnect all of the pairs of motors from said power supply line when there is a substantial difference between the current from said power supply line and said ground return lines as would be the result of a ground fault in any of the above circuitry.

No references cited.